United States Patent [19]

Nippes et al.

[11] Patent Number: 5,797,244
[45] Date of Patent: Aug. 25, 1998

[54] METHOD AND DEVICE FOR TRANSFERRING FILLED TEA BAGS FROM A SINGLE TEA BAG PACKAGING MACHINE TO A PROCESSING MACHINE

[75] Inventors: Helmut Nippes, Solingen-Merscheid; Friedhelm Funda, Wuppertal, both of Germany

[73] Assignee: Teepack Spezialmaschinen GmbH & Co. KG, Meerbusch, Germany

[21] Appl. No.: 757,580

[22] Filed: Nov. 27, 1996

[30] Foreign Application Priority Data

Nov. 30, 1995 [EP] European Pat. Off. ............ 95118827

[51] Int. Cl.⁶ .................................................. B65B 35/56
[52] U.S. Cl. ................... 53/446; 53/477; 53/134.2; 53/544
[58] Field of Search .................. 53/476, 477, 134.2, 53/537, 168, 282, 544, 446; 198/374, 436, 447

[56] References Cited

U.S. PATENT DOCUMENTS

| | | | |
|---|---|---|---|
| 1,132,285 | 3/1915 | Schafer | 198/374 |
| 2,141,460 | 12/1938 | Brown et al. | 198/374 |
| 3,201,912 | 8/1965 | Wozniak | 53/537 |
| 3,316,686 | 5/1967 | Welin-Berger | 53/134.2 |
| 3,848,394 | 11/1974 | Heisler | 198/374 |
| 3,916,600 | 11/1975 | Falt et al. | 53/168 |
| 4,417,433 | 11/1983 | Mitchell | 53/134.2 |
| 4,527,936 | 7/1985 | Hartlieb | 198/436 |
| 4,555,892 | 12/1985 | Dijkman | 198/374 |
| 4,731,974 | 3/1988 | Billi | 53/134.2 |

FOREIGN PATENT DOCUMENTS

| | | |
|---|---|---|
| 0370213 | 5/1990 | European Pat. Off. |
| 3942708 | 6/1990 | Germany. |
| 29514249 | 12/1995 | Germany. |

*Primary Examiner*—James F. Coan
*Assistant Examiner*—Gene L. Kim
*Attorney, Agent, or Firm*—Robert W. Becker & Associates

[57] ABSTRACT

A method for transferring filled tea bags from a single track tea packaging machine to a two-track processing machine includes the steps of feeding tea bags in single file to a transfer station and positioning each tea bag individually therein. The tea bags are deposited alternatingly to the left and to the right onto a left and a right track of the two-track transporting table by pivoting the tea bags in sequential movements about a first axis and about a second axis, wherein the first and second axes extend transverse to one another. The tea bags are then transported on the left and right tracks in double file to the processing machine.

2 Claims, 4 Drawing Sheets

1

METHOD AND DEVICE FOR TRANSFERRING FILLED TEA BAGS FROM A SINGLE TEA BAG PACKAGING MACHINE TO A PROCESSING MACHINE

BACKGROUND OF THE INVENTION

The invention relates to a method and a device for transferring filled tea bags, especially double chamber tea bags, from a fast single track tea bag packaging machine onto a double track processing machine for producing especially a hot-sealed envelope for the tea bag.

In a known tea bag packaging machine tea metered by a tea metering device comprising a metering wheel is placed in equal portions with a transmission wheel onto a filter paper strip that is continuously transported by a transporting machine. A hose is formed from the filter paper strip and individual filled double chamber tea bags are manufactured therefrom. The tea bag packaging machine is operated at extremely high speeds with an output of up to 400 tea bags per minute. Conventionally, the filled tea bags are individually gripped with a forceps-like gripping device from the prior art tea packaging machine and are then placed into a stacking chute for formation of packaging groups from where the groups are then guided to respective boxes in order to be packed therein. It is disadvantageous that highest requirements with respect to the flavoring of the tea packaged in this manner cannot be fulfilled because an absolutely tight flavoring seal is not possible with these packagings. External conditions such as air temperature and moisture in the air can affect the tea through the cardboard box and the filter paper in the form of a fleece material, and the quality of the tea during the course of time is thus degraded. Therefore, there is a great desire to seal the tea bag against the effect of air, light, and moisture and to package it so as to be flavor-sealed. For this purpose, it is known to introduce the individual tea bag into an aluminum composite foil envelope that is comprised of a rectangular material strip folded in half whereby the three originally open sides are hot-sealed after insertion of the tea bag so as to be tightly sealed. The double chamber tea bag in this envelope is positioned with its bottom on the folded edge. The folded edge, however, according to German Gebrauchsmuster 295 142 249.9, can also extend parallel to the longitudinal side of the tea bag whereby the folded aluminum composite envelope blank is to be sealed along two short sides and one longitudinal side.

It is an object of the present invention to provide a simple method and device for performing the method of transferring filled tea bags, especially double chamber tea bags, from a fast single track tea bag packaging machine onto a double track processing machine for producing especially the aforementioned envelope enclosure.

SUMMARY OF THE INVENTION

The inventive method for transferring filled tea bags from a single track tea packaging machine to a two-track processing machine according to the present invention is primarily characterized by:

Feeding single file tea bags on a single track to a transfer station and positioning each tea bag individually therein;

Alternatingly depositing the tea bags to the left and to the right onto a left and a right track of a two-track transporting table by pivoting the tea bags in sequential movements about a first axis and about a second axis, wherein the first and second axes extend transverse to one another;

Transporting the tea bags simultaneously on the left and right tracks.

Advantageously, the step of feeding includes positioning the tea bags upside down. The step of alternatingly depositing includes individually gripping the tea bags and rotating the tea bags alternatingly to the left and the right about 90° in a vertical plane, subsequently swiveling the tea bags into a horizontal position, and placing the tea bags onto a respective one of the left and right tracks. In the step of transporting, the tea bags are positioned head to head on the left and right tracks.

Advantageously, the method further includes the steps of inserting each one of the tea bags into an envelope blank having a folded edge and three open sides, hot-sealing the open sides after insertion of the tea bag, and positioning the folded edge so as to face outwardly when the envelope is transported on the two-track processing machine.

The present invention also relates to a transferring device (transfer station) for transferring filled tea bags from a single track tea packaging machine to a two-track processing machine.

The transferring device according to the present invention is primarily characterized by:

A pivoting device comprising a pivot arm with a tea bag receptacle for receiving a vertically positioned tea bag;

The pivoting device comprising a pivot drive for alternatingly pivoting the receptacle to the left and to the right about 90° into a first and a second end position;

A first swiveling device for swiveling a tea bag, contained in the receptacles in the first end position, into a horizontal position;

A second swiveling device for swiveling a tea bag, contained in the receptacle in the second end position, into a horizontal position;

A first tea bag pusher for moving the tea bag from the first swiveling device onto a first track of a two-track transport device for transporting the tea bag to a processing machine;

A second tea bag pusher for moving the tea bag from the second swiveling device onto a second track of the two-track transporting device for transporting the tea back to a processing machine.

Preferably, the device further comprises a tea bag feeder, positioned upstream of the pivoting device, for feeding sequentially the tea bags from a single track tea bag packaging machine into the receptacle.

Preferably, the tea bag feeder comprises an upwardly open compartment with a tea bag support and lateral guides and further comprises a pivotable lever to which the compartment is connected.

The pivoting device preferably further comprises:

A guide box having a substantially semi-circular interior forming the receptacle;

A triangular member with a central axle;

The central axle connected to the pivot drive such that the pivot drive rotates the central axle together with the triangular member in a reciprocating manner about 90° between the first and the second end position;

The triangular member laterally engaging a tea bag centrally positioned on the tea bag support and entraining the tea bag upon being rotated by the pivot drive into the first end position and entraining another tea bag, now positioned on the tea bag support, upon being rotated by the pivot drive into the second end position.

Preferably, the first swiveling device comprises a swiveling axle and a swiveling drive coupled to a drive unit of the tea bag packaging machine for synchronizing working cycles of the first swiveling device and the tea bag packaging machine. The guide box has a first lower part connected to the first swiveling axle so as to be swiveled toward the two-track processing machine and thereby swivel a tea bag from a vertical position into a horizontal position. The second swiveling device comprises a swiveling axle and a swiveling drive coupled to the drive unit of the tea bag packaging machine for synchronizing working cycles of the second swiveling device and the tea bag packaging machine. The guide box has a second lower part connected to the second swiveling axle so as to be swiveled toward the two-track processing machine and thereby swivel the tea bag from a vertical position into a horizontal position.

The device preferably further comprises a first tea bag pusher arranged at the first lower part and a second tea bag pusher arranged at the second lower part. The first lower part has a first window and the second lower part has a second window, wherein the first tea bag pusher extends through the first window for pushing a tea bag onto the two-track processing machine and wherein the second tea bag pusher extends through the second window for pushing a tea bag onto the two-track processing machine.

Advantageously, the pivot drive is coupled to a drive unit of the tea bag packaging machine for synchronizing working cycles of the device and the tea bag packaging machine.

The tea bags are preferably transported substantially horizontally with chain hooks in the two tracks of the two-track processing machine.

According to the present invention, the inventive method provides that the tea bags supplied to the transferring device are deposited in a combined rotating and swiveling movement alternatingly to the left and the right onto a two-track transport table on which they are transported in a double file arrangement. Preferably, in a first method step the tea bags, which are supplied to the transferring device in an upside down position, are sequentially gripped and are rotated alternatingly by 90° from their upside down position to the left and the right. In a second method step, the rotated tea bags are then swiveled into a horizontal position and placed onto the two-track transport table. On the transport table the tea bags are then transported in double file in a head-to-head arrangement to undergo further processing, for example, for enclosing them in an envelope. The envelope according to an expedient embodiment of the invention is provided in the form of a bag that is hot-sealed on three sides whereby the non-sealed folded edge at the bottom of the envelope is arranged on each one of the tracks so as to be facing outwardly. In this manner it is ensured that the bottom of each tea bag is oriented in the envelope toward the folded edge so that a consumer after opening the hot-sealed envelope can grip the head of the tea bag with the label and securing thread attached thereto for removing the tea bag from the envelope.

The inventive device is characterized in having a pivoting device with a tea bag receptacle for receiving a tea bag in an upright, especially upside-down arrangement, wherein the pivot device comprises a pivot arm and a pivot drive for alternatingly rotating the receptacle and the tea bag positioned within to the right or to the left about 90°. Subsequently, swiveling devices in both end positions swivel the tea bags into a horizontal position. The transferring device further comprises a tea bag pusher for moving the tea bag onto parallel extending tracks of a transport table which is provided with transport means for moving the tea bags, especially to a processing machine where the tea bags are enclosed in envelopes. The transfer of the tea bags from the "single file" tea bag packaging machine into the tea bag receptacle of the pivot device advantageously is carried out with a tea bag feeder which comprises a forceps-like gripping device for gripping the tea bags arranged upside down and which pushes the tea bags through a compartment comprising a tea bag support and lateral guides into the receptacle.

The pivot device is comprised in a preferred embodiment of the invention of a guide box with a substantially semi-circular interior serving as a recptacle for the tea bag, a rest or support for the tea bag, and a triangular member performing a part-circular movement within the guide box with the aid of a central axle that is pivoted in a reciprocating manner by the pivot drive about an angle of 90°. The triangular member laterally engages a tea bag resting on the tea bag rest centrally arranged in the interior and rotates with its pivoting movement about 90° the tea bag. With its return movement the triangular member engages a further tea bag, that has been positioned on the tea bag rest in the meantime, in order to move it into the opposite end position. The pivot drive expediently is coupled to the drive of the tea bag packaging machine in order to provide with simple means a synchronization of the machine operating cycles.

For further processing it is necessary to bring the tea bags from their vertical lateral position into a horizontal position. For this purpose a swiveling device is provided that, according to a preferred embodiment of the invention, is comprised of a lower part of the guide box in which the tea bag is positioned in its upright lateral position. This lower part is supported on a swivel axle and can be swiveled with a swivel drive in the transporting direction in order to be positioned in a flat, horizontal position. The swivel drive is also coupled to the machine drive of the tea bag packaging machine in order to synchronize the machine cycles. Expediently, the lower parts of the guide box have windows through which the push rod of a tea bag pusher can act onto the tea bag in order to move it according to the machine cycle onto the substantially horizontally extending tracks of the transport table. The transport table is provided with transport means for moving the tea bags.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 4.

Figure 1:
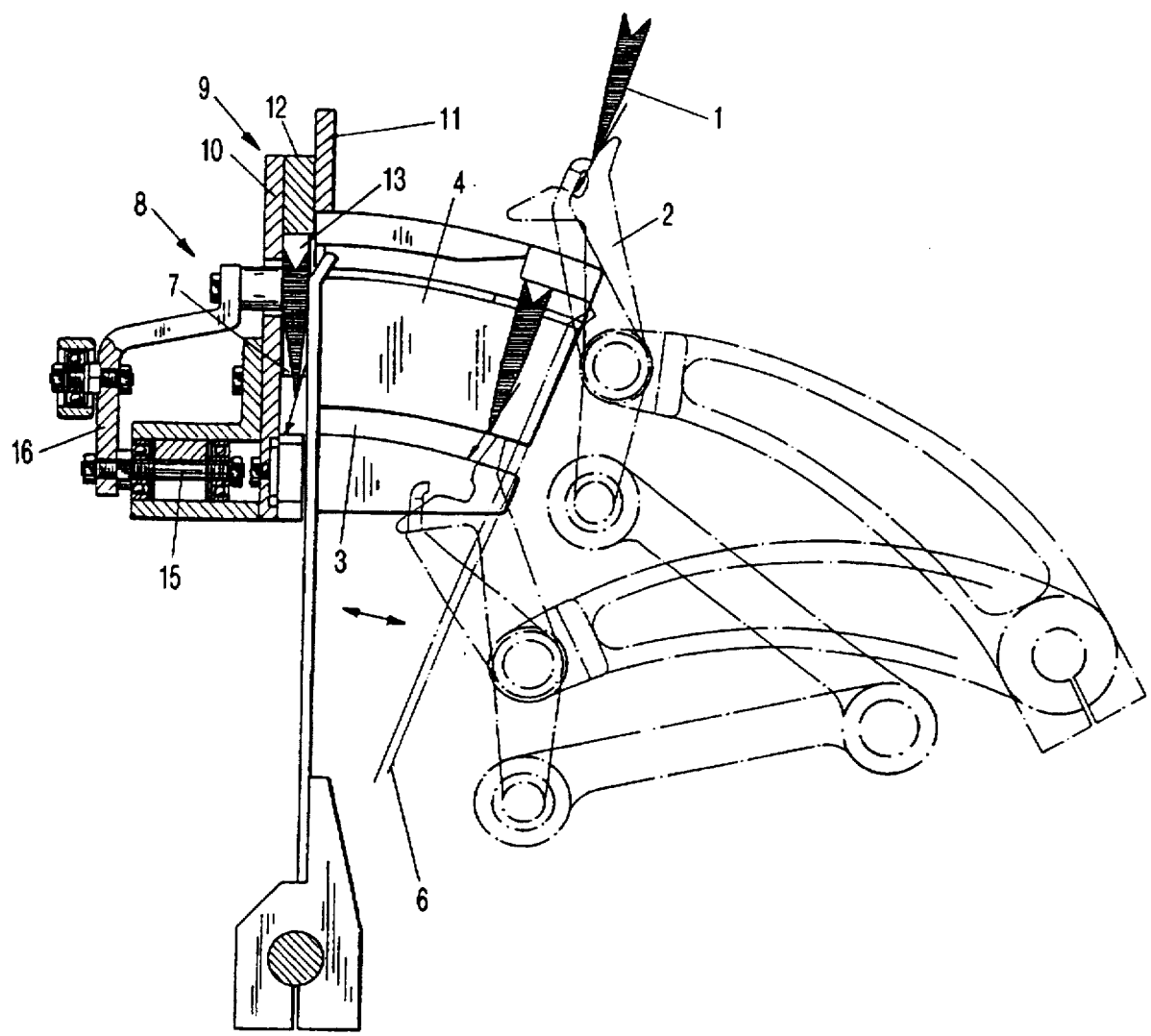
FIG. 1 is a side view according to section line I—I of FIG. 2 of a tea bag feeder and a pivoting device.
Figure 2:
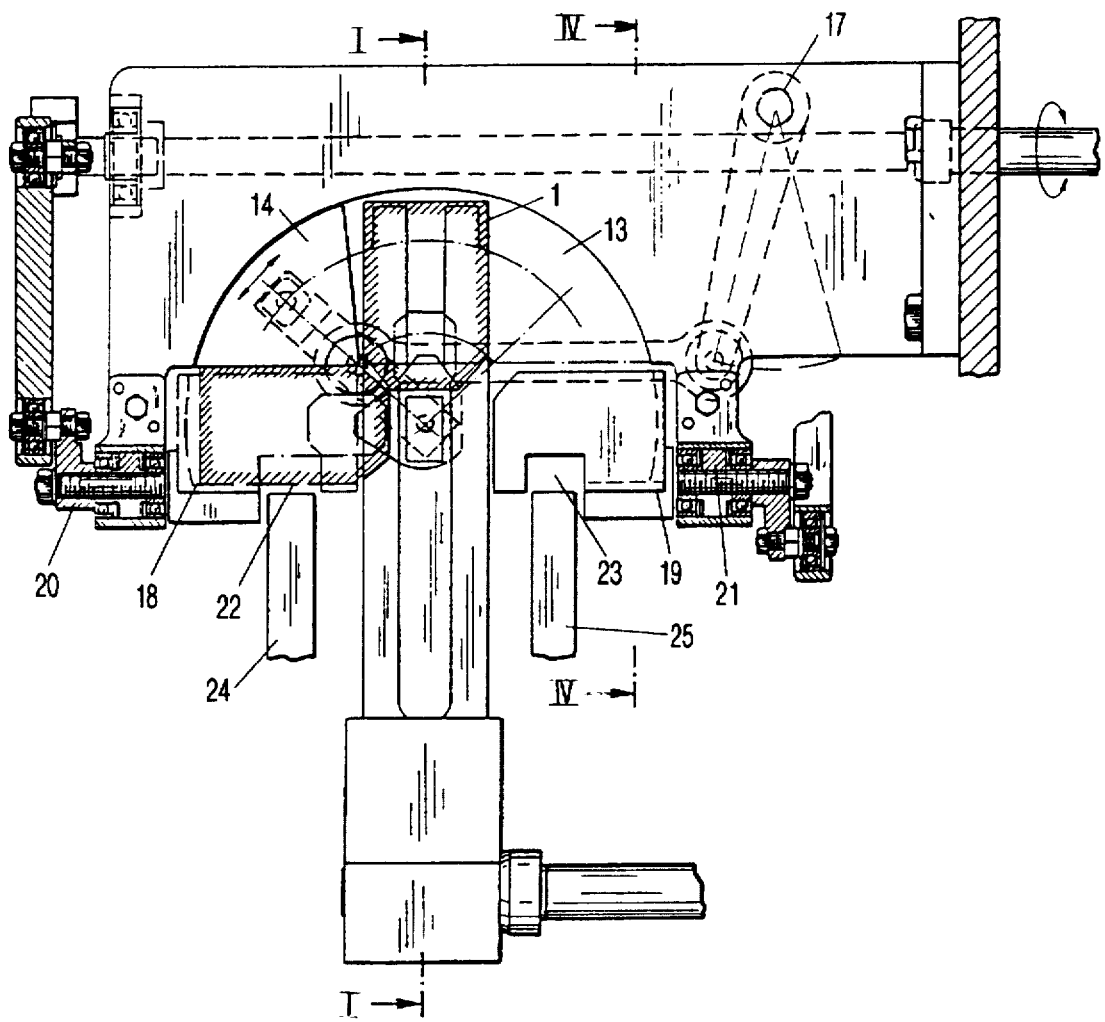
FIG. 2 is a front view of the tea bag feeder, the pivoting device, and a swivel device.

FIG. 1 of the drawing illustrates in a side sectional view corresponding to the section line I—I of FIG. 2 the transfer of filled double chamber tea bags 1 from a non-represented fast "single file" tea bag packaging machine having an output of up to 400 bags per minute to a transferring device for realizing further processing in a "double file" arrangement within a foil envelope packaging machine. For this purpose, the filled double chamber tea bags 1, which are positioned upside down, are gripped by a forceps-like gripping device 2 in order to be transferred from the tea bag packaging machine upstream thereof into a compartment of a tea bag feeder 6 comprised of a tea bag support 3 and lateral guides 4, 5. The pivot lever of the tea bag feeder 6 engages the tea bags within the compartment and moves them into a tea bag receptacle 7 of the pivot device 8. The tea bag feeder 6 is moved (as shown in FIG. 1 of the drawing in a dashed line) from the outer position at the compartment into the solid line end position. It is coupled with the machine drive for synchronized operation. In the end position the pivot lever of the tea bag feeder 6 closes the receptacle 7 for the tea bag for performing an uninterrupted rotation of the tea bag. Subsequently, the pivot lever of the tea bag feeder 6 is returned into the initial position (dashed line) in order to transfer the next tea bag into the receptacle.

The pivot device 8 is comprised of a guide box 9, consisting of a forward guide plate 10, a rearward guide plate 11, arranged at a distance to one another, and a cover plate 12 which together form a substantially semi-circular interior (receptacle) 13 for receiving and rotating/swiveling the double chamber tea bag 1. The compartment of the tea bag feeder 6 with its tea bag support 3 is fastened to the guide box 9.

Into the semi-circular interior 13 of the guide box 9 of the pivot device 8 a triangular member 14 is inserted that is pivotable according to the shown double arrow within a range of 90°. For this purpose, a central pivot axle 15 is supported at the guide box 9 which supports a pivot arm 16 that is a holder for the member 14, as can be seen especially in FIG. 1. A drive 17 is coupled to the pivot arm and is connected to the drive of the tea bag packaging machine in order to allow for a simple synchronization of the triangular member 14 to the machine cycle of the tea bag packaging machine.

According to FIG. 1 a filled double chamber tea bag has been guided in an upside down but substantially vertical position into the receptacle 7. The member 14, positioned, for example, in the same way as shown in FIG. 2 of the drawing, is moved by the pivot drive 17 to the right about the central axle 15 so that it displaces the centrally arranged tea bag to the right into a vertical lateral position in which the tea bag with its lower longitudinal edge rests at the lower part of the guide box 9. After another tea bag has been deposited in the receptacle 7, the member 14 is pivoted to the left and thus entrains the newly positioned tea bag in order to bring it into the respective lateral position of FIG. 2 at the left lower part of the guide box 9. The movement cycle is repeated synchronously with the working cycle of the tea bag packaging machine and realizes the transition from a single file machining operation to a double file or two-track further processing operation.

Figure 3:
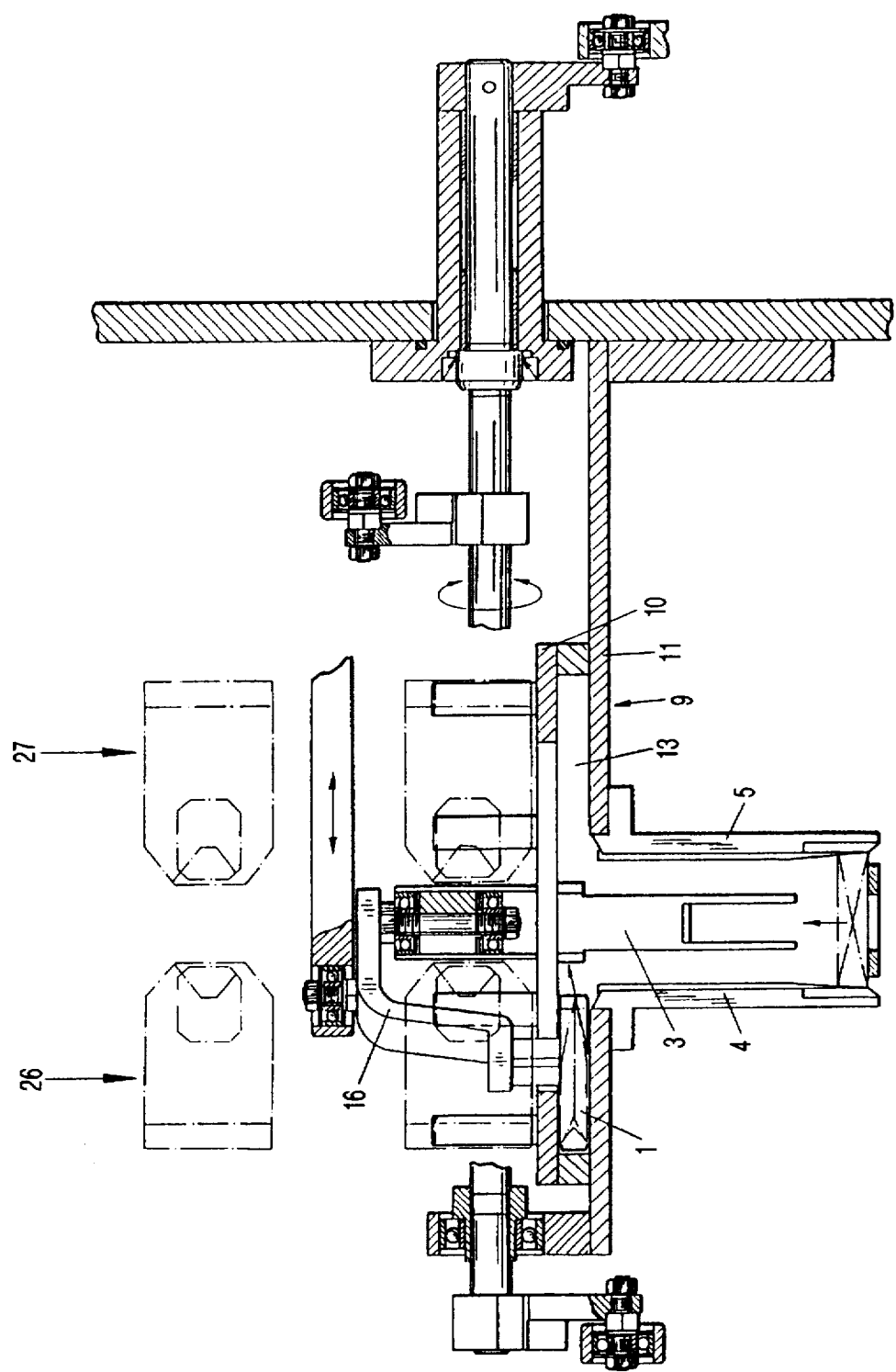
FIG. 3 is a plan view of the device of FIG. 2.
Figure 4:
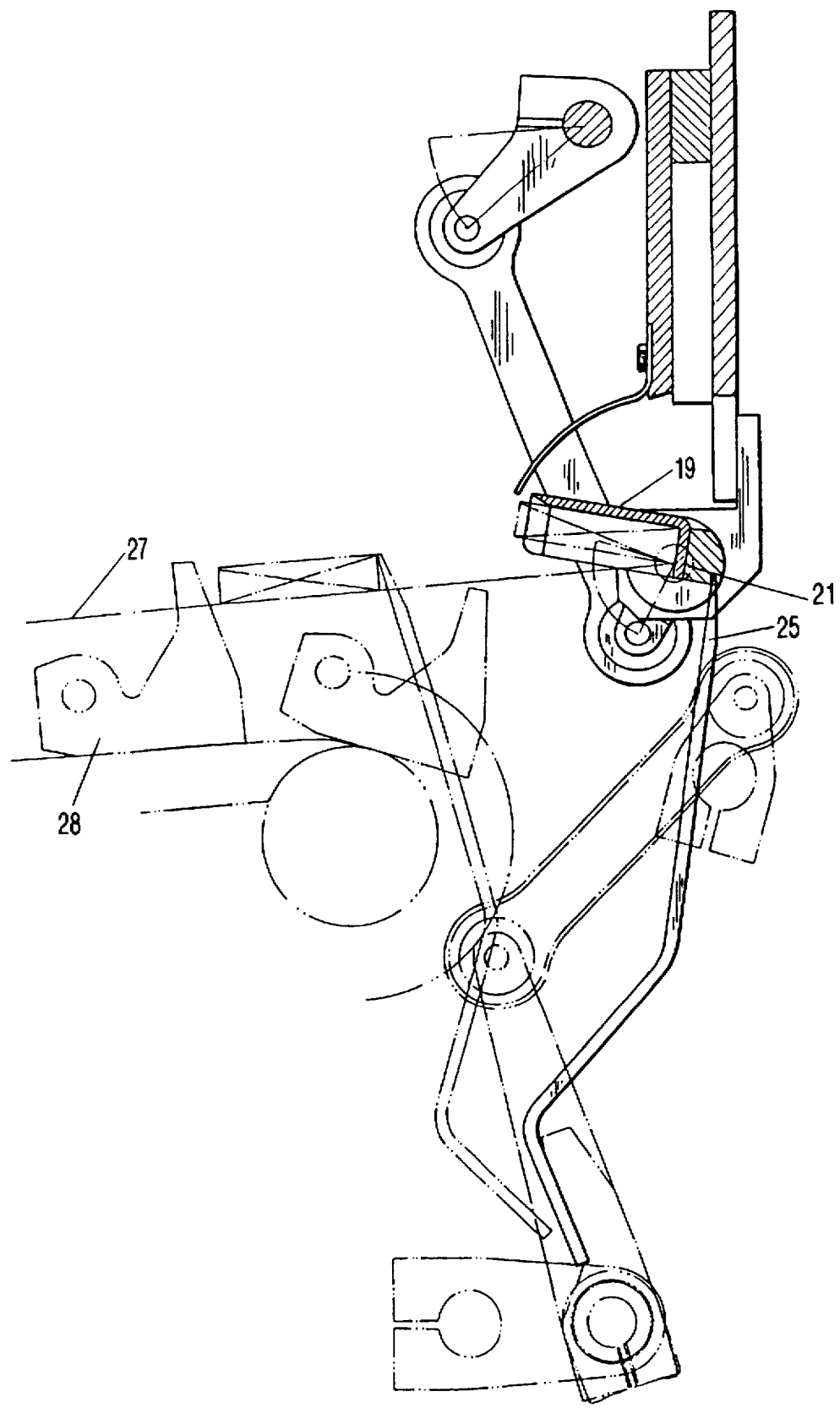
FIG. 4 is a section along section line IV—IV of FIG. 2 for illustrating the tea bag pusher.

In the subsequent method step the upwardly (vertically) positioned double chamber tea bags must be brought into a horizontal position in order to be reliably transported on a simple transport device, for example, a belt or transport table. For this purpose, the lower parts 18, 19 of the guide box 9 to the right and to the left have in cross-section an L-shaped design with an open front end. They are designed to be swiveled about the swivel axles 20 and 21, as shown in FIG. 4. The lower parts 18 and 19 of the guide box 9 comprise each a window 22, 23 through which a tea bag pusher 24, 25 can engage the double chamber tea bag positioned therein from behind and, after completion of the swivel movement represented in a dashed line in FIG. 4 of the drawing, can move the tea bags out of the guide box 9 onto the support track 26, 27 such that the tea bags are in a substantially horizontal position. The double chamber tea bags 1 on the two tracks 26 and 27 are positioned head to head and are arranged such that their bottom faces outwardly, as shown in FIG. 3 of the drawing. This is favorable for further processing.

The tea bag pushers 24, 25 are also coupled to the machine drive in order to synchronize their movements to the tea bag packaging machine. For the further transport of the double chamber tea bags on the tracks 26, 27 a transporting device including chain hooks 28 is provided.

In the processing machine arranged downstream of the transfer device the tea bags are then enclosed in foil envelopes in a double file processing method at half the operating cycle time of the tea bag packaging machine.

The present invention is, of course, in no way restricted to the specific disclosure of the specification and drawings, but also encompasses any modifications within the scope of the appended claims.

What we claim is:

1. A method for transferring filled tea bags from a single track tea packaging machine to a two-track processing machine, said method comprising the steps of:

feeding tea bags on a single track to a transfer station and positioning each tea bag individually therein;

individually gripping the tea bags and rotating the tea bags about a first axis alternatingly to the left and to the right toward a left and a right track of a two-track transporting table;

subsequently placing the tea bags onto the left and right tracks of the two-track transporting table by pivoting the tea bags about a second axis extending transverse to said first axis;

transporting the tea bags subsequently on the left and rights tracks;

wherein said step of feeding includes positioning the tea bags upside down;

wherein in said step of rotating the tea bags are rotated about 90° in a vertical plane;

wherein in said step of placing the tea bags are pivoted into a horizontal position; and wherein in said step of transporting the tea bags are positioned head to head on the left and right tracks.

2. A method according to claim 1, further including the steps of inserting each one of the tea bags in an envelope blank having a folded edge and three open sides, hot-sealing the open sides after insertion of the tea bag, and positioning the folded edge so as to face outwardly on the two-track processing machine.

* * * * *